April 21, 1964  E. KUHNLE ETAL  3,129,879
INCLINATION BALANCE WITH WEIGHT-SENSING DEVICE
Filed Sept. 12, 1962  2 Sheets-Sheet 1
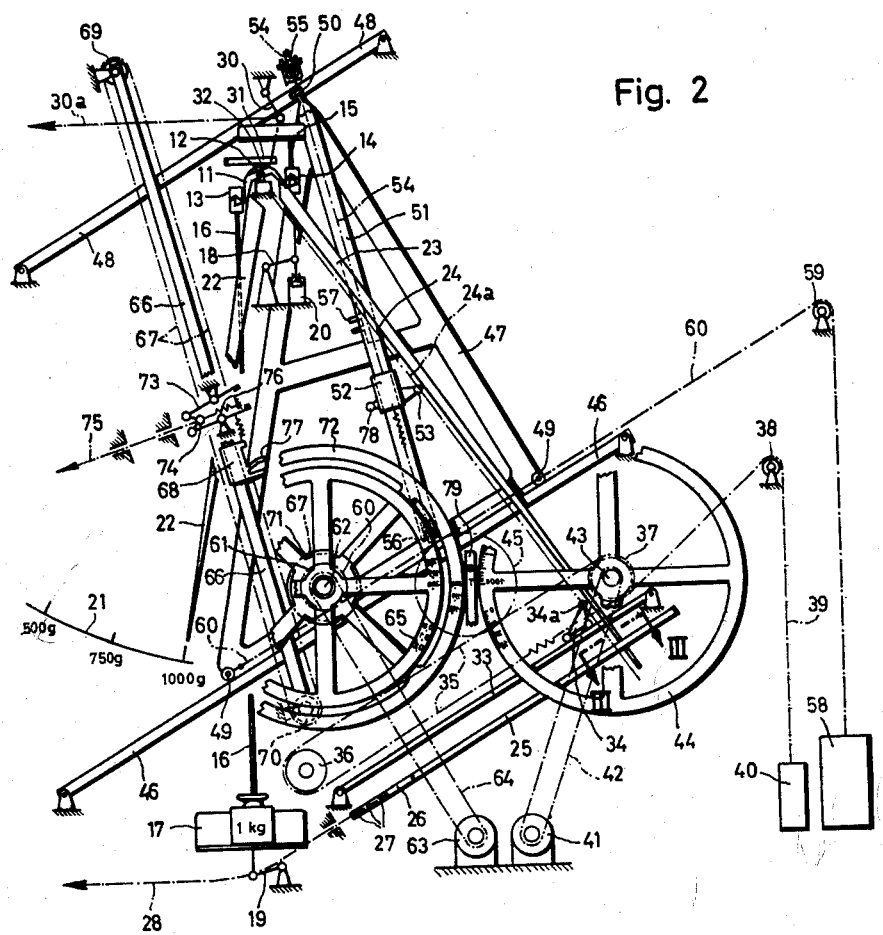
Fig. 2
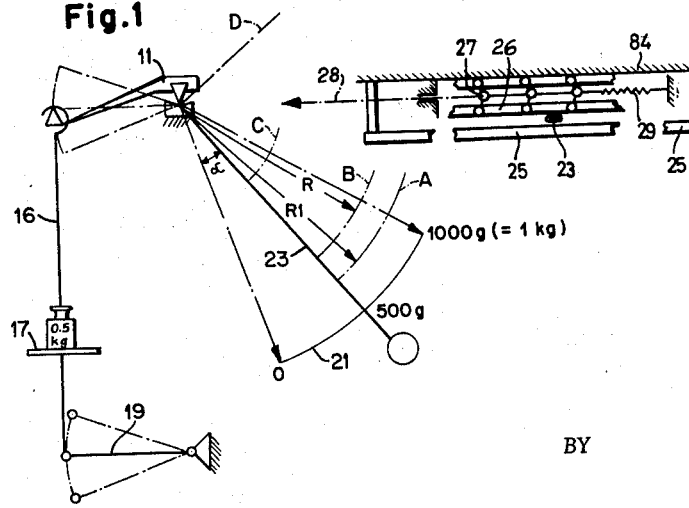
Fig. 1
Fig. 3
INVENTORS
Ernst Kuhnle
Josef Schwarz
BY Nolte & Nolte
ATTORNEY United States Patent Office 3,129,879
Patented Apr. 21, 1964

3,129,879
INCLINATION BALANCE WITH WEIGHT-
SENSING DEVICE
Ernst Kuhnle and Josef Schwarz, Balingen, Wurttemberg,
Germany, assignors to Bizerba-Werke, Wilhelm Kraut
KG., Balingen, Wurttemberg, Germany
Filed Sept. 12, 1962, Ser. No. 223,072
Claims priority, application Germany Sept. 21, 1961
15 Claims. (Cl. 235—61)

The present invention relates to an inclination balance having a tangential weight-sensing device for magnified weight indication and printing at the blocked deflected position.

This invention envisages in particular the use of an inclination balance in conjunction with a device for rapid, automatic determining of the weight and the sales price (total price) of the merchandise weighed, according to a pre-set unit price.

Devices are known which solve this problem by determining the weight on conventional automatic scales and then transmitting it digitally, at a relatively great expenditure in means, into a mechanical or, of late, an electronic computing machine, into which the corresponding unit price of the merchandise to be weighed had been previously introduced. After the computation has been made, all data are digitally printed on a label.

This principle has a considerable drawback in that, when the weight is sensed, it has to be converted into numerical values, the single unit of necessity determining the smallest steps. The weight has a major importance when the distances critical in the operation of the scales are determined. Hence, the weight is transmitted with lesser precision than sensed by the scales, an error of a maximum of approximately one half of the smallest step having been thus already introduced. This error enters into the price computation. Furthermore, computing machines are very complicated, need careful maintenance and are relatively expensive.

Mechanical computing machines work slowly. The fast electronic computers greatly exceed the admissible limits as far as initial costs, expense and susceptibility to trouble of weighing equipment are concerned.

Suggestions were also made to solve this problem by substituting an analog computer connected to the scales directly or indirectly, for the digital computing machine. The thought, so to modify the measuring displacement established by conventional scales and exactly analogous to the weight, by means of a geometrical gear that price-measuring distances are obtained, and then to indicate the two converted measuring displacements on two separate dials, approaches to a certain extent the ideal solution; however, until now the suggested arrangements were exceedingly complicated and unpracticable.

The present invention is based on the recognition that the geometrical gear means have to be so constructed and matched to the scales that there is no reactive effect exerted on the latter. The value conversion is effected with high precision when the weight is sensed; all results are properly correlated with each other so that they can be printed at a central location on a label as small as possible.

It is thus one of the major objects of the invention to provide an inclination balance which avoids the drawbacks of hitherto known scales and balances of this type.

It is a further object to provide an inclination balance having a device for the rapid, automatic determination of the net weight of the merchandise weighed, and of the total sales price according to a pre-set unit price and the weight just established.

It is another object of the invention to provide a balance system in which all established data (like weight, total price, as well as the introduced unit price, and preferably additional indicia) are available at a central location where they may be viewed and/or printed, e.g. on a label to be attached to the merchandise.

Another object of the invention is to provide a balance having an automatic locking and release device for the adjusting member, operative in the so-called subzero position of the balance for re-adjusting the price-sensing means.

It is a still further object of the invention to provide a mechanism which is foolproof and reliable in operation, easy to manufacture and assemble, and which is adaptable to various operational conditions.

The present invention solves the above objects by providing a second sensing slide for the price in addition to the weight sensing slide. According to one of the major features of the invention, the sensing travel of the second slide, parallel to that of the first slide and corresponding to the various unit prices, is adjustable to varying distances from the fulcrum of the pendulum of the inclination balance. The distances travelled by the price-sensing slide are indicated on a printable or readable dial or disc as a total price in dependence on the weight and the unit price. Thus, the weight and the unit price are sensed simultaneously, extremely rapidly and precisely in the form of analogous measuring distances, by means of a very simple balance system. By means of equally simple set-up or magnifying gears these data are then made available so that a combined indication at a central location and a combined imprint on a small label are possible.

According to another feature, the total price indicating means is so arranged with respect to the weight indicating means that both values can be read off or imprinted directly adjacent each other.

It is a further feature that the balance is so constructed that the unit-price indicating means and adjusting means therefor are so arranged on the balance frame that the preset unit price can be likewise read off in the proximity of the weight and total-price indications.

According to a particularly advantageous feature of the invention, it is envisioned that, at a sub-zero position of the balance, the price-sensing means of the price slide can be adjusted to an optional new position by means of a member actuated by the unit-price indicating means and its adjusting means. In this embodiment it is recommended to provide an automatic locking and release for the adjusting member, in its initial and end positions within the range of adjustment.

A particularly high degree of precision in the transmission of values is achieved by a still further feature according to which all sensing members with their ancillary indicating, imprinting and adjusting means are interconnected by means of steel-band drive means exclusively. Also, for the weight and the total-price sensing, an engaging edge rigid with the balance is provided which co-operates with a cylinder, e.g. with a ball-bearing, rigid with the slide. To this purpose, the sensing or engaging edge is displaced from its theoretically ideal position by half the diameter of the cylinder.

According to a still further feature, harmful stresses of the balance elements are avoided, thanks to a damping device which is effective during the displacement of the weight and the total-price sensing and indicating means into the sub-zero position or the sensing position.

It is another feature of the invention that a drive working with constant energy storage, e.g. a weight drive, is provided for the movement of the sensing slide, so that a constant pressure of the sensing forces is achieved; a motor drive is provided for the return movement.

The inclination balance according to the present invention can be also used in a manner different from the one described hereinabove, e.g., in that the sensing members, directly or indirectly, actuate means carrying optically magnified weight and total-price dials, or in that said members actuate indicating means carrying calibrations, indicia or coded markings suitable for mechanical, electrical or photo-electrical value sensing.

Other objects, features and many of the attendant advantages of the invention will be readily appreciated as the same becomes better understood by reference to the following detailed description, when considered with the accompanying drawings, wherein FIG. 1 is a schematic illustration of the co-operating beams and their relative positions, forming the basis for the inclination balance according to the present invention;

FIG. 2 is a front elevation of the inclination balance, with the surrounding cabinet and some less important parts omitted;

FIG. 3 is a partly sectional view taken in the direction of line III—III of FIG. 2.

Figure 4:
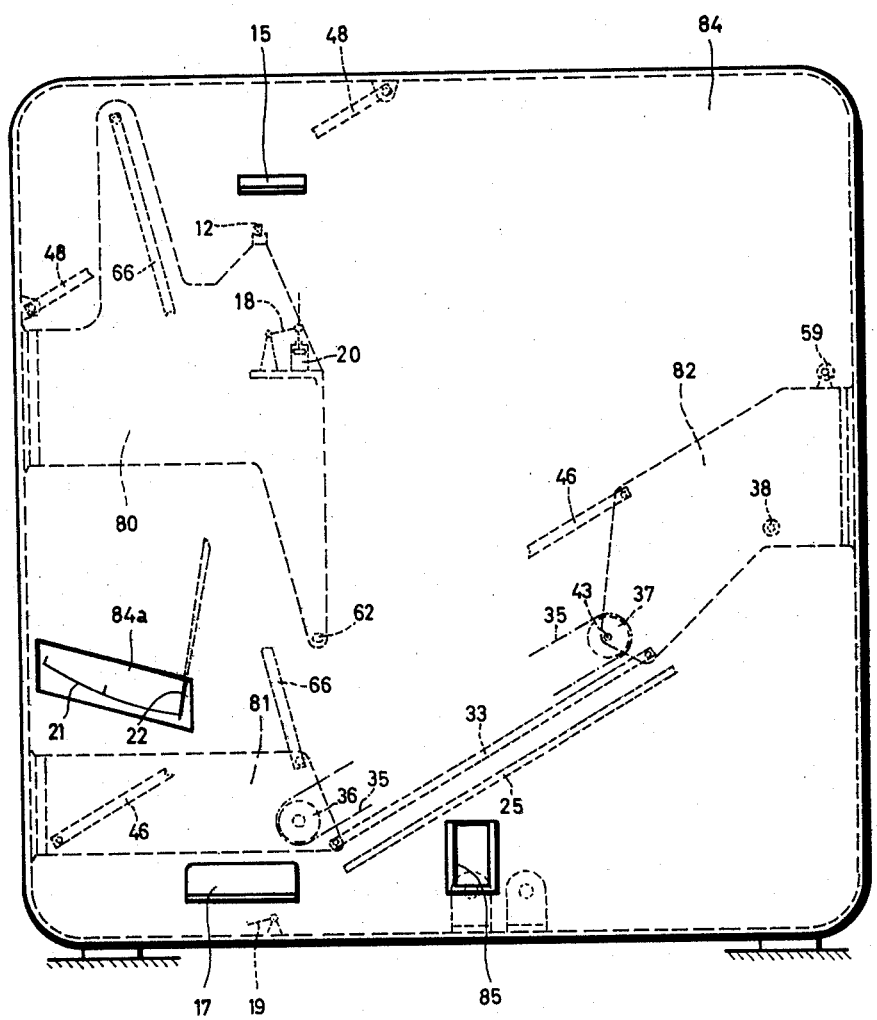
FIG. 4 shows the balance cabinet, in a view similar to FIG. 2, with supports and brackets, and some of the components of the balance held thereby.

The schematic illustration of FIG. 1 shows a balance beam 11, a rod 16 suspended at one end thereof, and a scale platform 17 attached to said rod. The lower end of the latter is guided for vertical reciprocation by a guide rod 19 the remote end of which is held stationary, e.g. by being attached to the cabinet (not shown). An inclination pendulum or beam 23 is secured to the balance beam 11 for simultaneous movement therewith; in this schematic view, the beam 23 also acts as a pointer adapted to swing along a dial 21 carrying weight indicia (e.g., 0 to 1000 g. (grams)=1 kg. (kilogram), as shown).

This is an inclination balance based on the one-lever system, the load to be weighed being guided exactly vertically on knife-edge supports. The angle of deviation $\alpha$ (alpha) which varies according to the load applied, is indicated on the dial calibrated in weight units, by means of the pointer attached to the balance beam. The tangent of the angle of deviation $\alpha$ is proportional to the load applied. After the balance has been clamped in its position of equilibrium, the tangent can be determined by means of a follower slide at a distance $R_1$ from the system's central point. Line A represents the weight indication, e.g. 0.5 kg. (or 500 g.), which may be expressed in any other weight unit, for example, pounds. The following path, enlarged by means of drive and band drums, can be represented on an imprintable, linearly calibrated rotating dial.

Another, similar tangential sensing device functions in a manner analogous to the first-described one, with varying adjustable distances R from the system's central point, and similarly shows the determined tangential value on a linearly calibrated rotating dial capable of being printed. Line B denotes the maximum adjustable unit price value, for example $10.—per kilogram, which can, of course, be given in any optional currency. Line C is illustrative of the arbitrary intermediate value of $5/kg.

These values determined by means of the second device correspond to reduced weight-dial values and can be so divided that they correspond to certain total-price amounts. When the adjustment of the second sensing device is so chosen that distance R becomes equal to zero, as shown at line D, the tangent cannot be determined in the same way. This would correspond to a unit price which would equal zero, in which case the total price indicated would be zero for any desired weight.

The inclination-balance system according to the invention is so laid out that the maximum pre-settable unit price can be established on a radius R (line B) which is smaller than $R_1$ (line A). The maximum length of the distance R is so chosen as to be as long as possible.

The second sensing device can be set to any desired number of intermediate values, by the aid of appropriate adjusting means. Every adjusting position between the pivotal point of the system (line D) and any desired adjustment R (for distance at line C) corresponds to a certain unit price of the goods. The tangent value sensed by the balance corresponds to the total price resulting from the multiplication of the weight value with the preset unit price value.

In the practical embodiment shown in FIGS. 2 to 4, the inclination balance, its tangential weight-sensing device and the printer are housed in a cabinet 84 (FIG. 4). The scale platform 17 of the balance and a label-dispensing pan 85 of the printer (not shown) protrude from the lower part of the front panel of said cabinet, adjacent its lower edge. A second weight platform 15 also protrudes from this front panel, but is arranged in the upper part thereof.

The inner surfaces of the side walls of the casing 84 carry supports and brackets 80, 81, 82 which support the knife edges, counter-edges, guide rollers, dampers, guide rods, and the like.

Although the structural and operational features of the inventive inclination balance will be described hereinafter in full detail, it should be pointed out at this point that the entire system may be considered as comprising three major groups of components or stages, namely, a weighing stage for establishing the net weight of goods placed on the scale platform 17, a calculating or computing stage for producing a total sales price out of the established weight and the unit price pre-set in the device, and finally, a printer stage in which all data (that is, weight, total price and preferably also the unit price) are simultaneously displayed and/or printed on labels (not shown) adapted to be applied to the weighed goods. The means for storing a supply of labels (e.g. in the form of a continuous band), for inking the indicia of the printing dials, for guiding the band and the labels before, during and after the printing, for cutting and preferably for heating the labels before they are dispensed, do not form the subject matter of the present invention and are not shown in detail. Substantially under the printing location, to be described in full detail, the labels are dispensed at the pan 85 so that they can be applied to the goods located on the nearby platform 17.

FIG. 2 shows the inner mechanism of the inclination balance; the cabinet 84 has been omitted for the sake of clarity along with a few less important parts. The balance beam 11 is double-armed and has two main knife-edge supports 12 and, on the two arm ends, load-supporting edges 13 and counter edges 14. The latter carry the weight platform 15 to take the tare compensation (wrapping material as used for the packaged goods placed on the platform 17). As explained in connection with FIG. 1, the platform 17 is suspended by means of rod 16 from the load-supporting edges 13.

Both the tare-weight pan 15 and the scale platform 17 are guided in a substantially vertical direction and parallel to their positions by means of the lower guide rod 19 and an upper guide rod 18. A damper 20 is operatively connected to the member interconnecting pan 15 and rod 18. A pointer 22 is rigidly connected to balance beam 11 and swings along dial 21. The latter is calibrated to show the weight of the goods placed on platform 17 (the pointer position shown in FIG. 2 indicates 1,000 g. (grams)=1 kg. (kilogram), the load applied to platform 17). The front panel of the cabinet 84 has an inspection window for the observation of dial 21 from which the net weight of the goods may be ascertained.

The inclination weight or pendulum 23 is also rigidly connected to balance beam 11. For the sake of simplicity, the rigidly connected system 22—11—23 of FIG. 2 is represented in FIG. 1 by the elements 11 and 23 alone. The weight distribution of pendulum 23 is such that full pointer deflection is achieved when a load of 1,000 g. is applied. The pendulum 23 is elongated and has a straight sensing edge 24 running parallel to an ideal or theoretical sensing line 24a which passes through the rotation center of the system, that is, through the knife-edge line of the beam 11.

FIG. 3 shows that within the region of swing of the end portion of pendulum 23, a clamping device is provided, comprising a stationary rail 25 and a clamping rail 26. The latter can be moved by a motorically actuated pull member 28, through the intermediary of a bell-crank lever 27, and against a biasing spring 29, into a clamping or engaging position with respect to the end of pendulum 23. When the traction at member 28 ceases, the rail 26 is pulled back into the initial position by spring 29, releasing thereby the clamping action at 23.

For securing the knife-edge journaling of the beam 11, a toggle lever 30 is provided which may be actuated, simultaneously with the rails 25, 26, by the intermediary of a motorically operated pull 30a. Lever 30 is adapted to exert pressure on a cylindrical surface 32, provided on the balance beam 11 centrally to its line of edge, through the action of a rocking lever 31.

A straight sensing rail 33 is arranged in the region of the swinging end of the inclination beam 23, parallel to its plane of swing, and perpendicular to the half-load position of the sensing line 24a. A weight sensing slide 34 is adapted to run along the rail 33 and has a sensing element 34a to be described hereunder in more detail, which co-operates with the sensing edge 24. A steel band 35 running over a guide roller 36 and over a band drum 37 serves to adjust the slide 34.

The drum 37 or the steel band 35 is acted upon by a pull element 39 guided around a roller 38; the element 39 has a weight 40 attached to its remote end so that it is capable of pulling the slide 34 to its sensing position, and also makes for uniform contact pressure. A motor 41 is provided for moving the slide 34 back in a direction away from the weight 40, and acts upon a shaft 43 of drum 37 by the intermediary of an endless drive 42. Shaft 43 also holds a weight-indicating dial 44. The indicia of this dial are so applied that the numerical values are readable or printable within a region or zone 45 indicated by a dot-dash circle.

Parallel to the first sensing rail 33 there is another sensing rail 46, arranged within the region of movement of the pendulum 23 but closer to its center of swing. In turn, rail 46 has a straight guide edge for a second, larger slide 47 which, according to a preferred embodiment and as shown in FIG. 2, has a triangular shape and is adapted to move with its base edge along rail 46. With a view to maintaining the position of the slide 47, another rail 48, substantially parallel with rail 46, is supported by the cabinet at the upper tip of the triangle. The bottom edge of slide 47 is guided along rail 46 with roller bearings 49 while the top of the slide has a ball bearing 50 engaging rail 48.

The large slide 47 carries a straight rail 51 arranged parallel to the ideal sensing line 24a of the inclination weight 23 when the latter is in the "zero" position of weight indication. A price sensing slide 52 is adjustable along rail 51 and engages sensing edge 24 of inclination weight 23 by means of a contact bearing 53 which may be a ball bearing. The slide 52 is connected with a steel band 54 guided in continuous fashion over rollers 55, 56 at respective ends of said rail 51. A clamping device 57 is adapted to immobilize the slide 52 with respect to the rail 51 by its action on the band 54. Underneath the slide 52, a spring is shown for tensioning the band 54.

For approaching the vertically adjusted and immobilized slide 52 toward the sensing edge 24 of the pendulum 23, the large slide 47 is connected to one end of a pull element 60 (cable, band or the like) guided over a roller 59. A weight 58 secured to the other end of element 60 tends to urge the slide 52 into contact with edge 24, and assures constant contact pressure. The band or cable 60 is wound around a step of a band drum 61 rotatable about a stationary shaft 62. Another motor 63 is used for returning the large slide 47 toward the left-hand side, as viewed in FIG. 2; it engages another step of drum 61 through the intermediary of an endless drive 64. Under the effect of motor 63, the weight 58 is raised so that the slide 47 can follow the movement of the cable 60 owing to its considerable dead weight.

A dial 65 for indicating the total price is connected to the drum 61. In a manner similar to that described for dial 44 which indicates weight values, the numbers of this dial are capable of being read and/or printed at the location 45.

Parallel to rail 51 there is a stationary adjusting rail 66. By means of an endless steel band 67, and adjustable follower slide 68 can move along rail 66. Band 67 is guided over rollers 69, 70 and is also made to pass around a drum 71 rotatable about shaft 62. A unit-price dial 72 is rigidly connected with the drum 71. This dial carrier indicia, as shown in the drawing, intermediate those of the dials 44 and 65, and within the region 45, capable of being read or printed concurrently therewith.

Next to rail 66 there is an unlocking device 73 operated, through an elbow joint 74, by means of a motorically actuated pull 75. The latter is adapted to unlock the device 73 while a return spring 76 urges the system back into the locked position.

The unlocking device 73 is operatively connected with the clamping device 57 when the slide 47 reaches the sub-zero position. This occurs when scale platform 17 is empty while a tare weight or wrapping is placed on platform 15 (or, if the latter is more heavily loaded than the former), resulting in an indication on the negative side of zero. This connection allows the device 57 to be operated manually, and released again, while the system is in the sub-zero condition.

In this condition of the slide 47, a fork member 77 of the follower slide 68 cooperates with a second contact bearing 78 attached, together with bearing 53, to the price-sensing slide 52. In this case the adjustment of slide 68 will also move the slide 52 which is, however, only possible in said sub-zero position of the inclination balance.

Conventional mechanical and electrical means (not shown) are provided for locking and correlating the operative elements of the balance so that the pre-adjustment of the unit price is not possible except while the slide 47 is in said sub-zero condition.

Between the printable dials 44, 65 and 72 there is space left within region 45 for additional printing means of which, as a matter of example, one slide is shown at 79. This may carry letter, date or other indicia which may be displayed or printed on a relatively small surface, e.g. a label, together with the data of the other printing means represented by the dials 44, 65, 72.

Since the sensing elements 53, 34a of the respective price and weight slides 52, 34 both cooperate with the sensing edge of the inclination weight 23, which changes its inclination with respect to the sensing direction in dependence of the weight reading, it is only possible to contact the edge 24 either with a sharp edge or with a centrally journalled ball bearing or rotational body. The central axis of the latter has to lie on the ideal sensing line 24a, which can be accomplished by appropriate dimensioning of its diameter, so that the center of the cylindrical sensing element will follow the theoretical line 24a.

With a view to destroy or at least compensate the relatively high kinetic energy of the large slide 47 and of the weight slide 34 when moving into contact with the sensing edge 24 and, conversely, when moving back into the so-called sub-zero position, conventional, for example hydraulically operated, damping means may be provided (not shown).

The simple embodiment here described first only permits the imprinting of the values of the three different dial discs. In case it is desired to have the data indicated digitally, it is easily possible to provide fully digital indication by known means, through auxiliary directional and follower movements. Similarly, the sensing movements can be translated into individual impulses, which can be produced, for example, photoelectrically and stored in a counting means the results of which may be reproduced by printing. It is likewise feasible to scan the sensing movements of slides 34 and 52 by means of code track markings and to represent the values so that they can be printed. These structural refinements are not described herein or illustrated in more detail.

The operation of the inclination balance of the described preferred embodiment is as follows:

When the balance is not loaded at platform 17, all operative elements are in the sub-zero position, with the slide 47 and the adjusting rail 51 in immediate proximity of the other adjusting rail 66. Clamping device 57 is thus held in the clamped position by unlocking device 73, preventing the adjustment of price slide 52.

For operating the balance, the motor-actuated pull 75 first actuates the unlocking device 73 so as to release the clamping device 57. Hereupon, the unit-price dial 72 is manually set by means not shown so that the price of the merchandise to be weighed appears at the viewing and printing location 45. Simultaneously, steel band 67 moves follower slide 68 and price slide 52 (which is linked to the former owing to the coupled position of bearing 78 and fork 77 while the balance is in the subzero position) along rail 51 into a specific vertical position corresponding to the selected unit price. This is followed by device 57 being clamped owing to the actuation of the unlocking device 73, and thus by slide 52 being blocked on rail 51.

When the load (merchandise) is applied to platform 17 and the tare to pan 15, the pointer 22 swings into the weight-indicating position readable on dial 21. Now the inclination weight 23 is deflected, as illustrated. Hereafter, the weight 23 is immobilized in its actual position by operation of pull member 28. Release means, not illustrated, allow the slide 34 to move into the contacting position illustrated in FIG. 2 (on effect of weight 40), and the large slide 47 to be displaced (by the weight 58). The sensing element 34a of the slide 34 as well as the contact bearing 53 of the price sensing slide 52, on the large slide 47, both abut against the sensing edge 24 of the inclination pendulum 23.

During this sensing or contacting action, the previously described band-shaped pull elements 39, 60 cause the dials 44, 65, indicating net weight and total price, respectively, to assume their respective indicating positions. These values may be ascertained and/or printed on a label, as mentioned before. The printed label displaying the pre-set unit price, the established net weight, and the total (sales) price, and any other optionally added pertinent data, is dispensed at the pan 85 arranged at the lower portion of the cabinet 84.

After the termination of the printing step, the slides 34 and 47 are returned to the previously described sub-zero position with the aid of retracting motors 41 and 63. After the weighed merchandise has been removed and a new one put on which has a different unit price, the unlocking device 73 is operated and subsequently the unit-price disc 72, and thus the price slide 52 with it, is displaced along and again immobilized with respect to adjusting rail 51.

Due to the change in distance thus brought about the sensing element 53 of the price-sensing slide 52 and the swing axis of the inclination weight, when, for example, a piece of goods is applied having a weight equal to that previously weighed, a faster or more delayed contact of slide 52 occurs with respect to sensing line 24a, resulting in a lower or higher total price being indicated, respectively.

It should be understood, of course, that the foregoing disclosure relates only to a preferred embodiment and to preferred structural details of the invention, and that it is intended to cover all changes and modifications of the example described which do not constitute departures from the spirit and scope of the invention as set forth in the appended claims.

For the purpose of printing onto a strip of paper the values at the indicating positions of the printable elements, there are provided in the cabinet 84 a roll of paper strip, a stepwise pushing mechanism for the strip, a cutting device and a depending chute. By these elements (not shown) the printed end of the strip is cut therefrom and falls down along the chute to the dispensing pan 85. Thereafter the pulling mechanism pulls the strip into the printing device for the length of another label to be printed.

This arrangement is different from that of our copending application as the computing apparatus of that application is involved of the weighing mechanism in this case and is combined with the printing apparatus.

The bell-crank or toggle levers 27 actuating the clamping rail 26 are fixed at one of their ends to the cabinet 84 which also carries the stationary rail 25 at a distance thereof.

We claim:

1. An inclination balance having a cabinet, a pivotable double-arm balance beam, a first platform for goods to be weighed, a second platform for applying tare weights to be deducted from individual gross-weight values established from said first platform, so as to obtain net-weight values therefrom, each platform being operatively connected to a respective arm of said beam, an inclination pendulum secured to said beam for simultaneous oscillation therewith, a tangential weight-sensing device for magnified weight indication and printing at a blocked, deflected position of said pendulum, comprising, in combination, a sensing edge extending along at least part of said pendulum and adapted to be engaged by co-operating elements of said weight-sensing device, said sensing edge being parallel to but a small distance apart from the theoretical sensing line of said pendulum when the latter is in a position corresponding to zero weight, a stationary first sensing rail mounted in said cabinet parallel to the plane of oscillation of said pendulum and substantially perpendicular to an intermediate position of said sensing edge, said tangential weight-sensing device including a first sensing element movable along said first sensing rail and adapted to abut said sensing edge, a stationary second sensing rail mounted parallel to said first sensing rail, a sensing slide movable along said second sensing rail, biasing means for separately urging said first sensing element and said sensing slide in a direction toward said sensing edge, a first adjusting rail supported by said sensing slide parallel to said theoretical sensing line, said tangential weight-sensing device further including a second sensing element slidably supported by said first adjusting rail, a stationary second adjusting rail mounted substantially parallel to said first adjusting rail, a follower slide slidably supported by said second adjusting rail, first, second and third dial means for respectively displaying said net-weight values, pre-set unit prices applicable to said goods and respective total prices of the latter, said tangential weight-sensing device further including means for introducing said unit prices, said follower slide and said second sensing element being adapted to move along said first adjusting rail into a specific vertical position corresponding to said unit prices, means for immobilizing said second sensing element with respect to said first adjusting rail, means for immobilizing said pendulum in said deflected position corresponding to a specific one of said net-weight values, and means for operatively coupling together said second sensing element and said follower slide, said tangential weight-sensing device also including means for actuating said first and said third dial means for displaying said net-weight values and said total prices of the goods upon completion of each weighing operation.

2. An inclination balance according to claim 1, wherein said first and said third dial means carry respective net-weight and total-price indicia, the indicia corresponding to said specific one net-weight value and to a corresponding specific total-price value being displayed in close proximity to one another.

3. An inclination balance according to claim 2, wherein said actuating means also operates said second dial means for displaying said unit-price values, said second dial means carrying unit-price indicia, the indicium correlated with said vertical unit-price position being displayed in close proximity to said specific net-weight and total-price indicia.

4. An inclination balance according to claim 1, wherein said coupling means includes mating contact members on said second sensing element and said follower slide, and wherein said second sensing element has a contact bearing co-operating with said sensing edge and adjustable through said introducing means in a sub-zero position of said pendulum.

5. An inclination balance according to claim 4, further comprising unlocking means for selectively locking and unlocking said second sensing element in the starting and closing phases of its adjustment.

6. An inclination balance according to claim 5, wherein said tangential weight-sensing device further includes elongated pull members for operating at least said first and said second sensing elements as well as said follower slide, and wherein said biasing means includes at least one elongated pull member for operating said sensing slide.

7. An inclination balance according to claim 1, wherein said co-operating elements consist of first and second contact bearings respectively secured to said first and said second sensing elements and abutting against said sensing edge upon actuation of said biasing means.

8. An inclination balance according to claim 1, further comprising damping means operative during the displacements of operative elements of said tangential weight-sensing device from a sub-zero position of said pendulum when said platforms are unloaded to a sensing position when at least said gross-weight values are established.

9. An inclination balance according to claim 1, wherein said biasing means include constant-force drives for urging said first sensing element and said sensing slide toward said sensing edge, and further comprising separately actuatable drive means for returning the afore-mentioned members to their initial positions remote from said sensing edge.

10. An inclination balance according to claim 1, further comprising optical means carrying magnified weight and total-price dials, said optical means being actuable through the intermediary of said first and said second sensing elements, for displaying said net-weight values and said total prices.

11. An inclination balance according to claim 1, wherein said first and said second sensing elements have coded markings adapted for value sensing by extraneous means.

12. An inclination balance according to claim 1, further comprising a weight-calibrated dial and a pointer secured to said balance beam for swinging along said dial so as visually to display said net-weight values.

13. An inclination balance according to claim 1, wherein said second and said third dial means are concentric with each other and carry respective unit-price and total-price indicia displayed in a substantially straight line.

14. An inclination balance according to claim 1, wherein said sensing slide is substantially triangular, the base of the triangle being slidable along said second sensing rail, and further comprising a guide rail parallel to said second sensing rail and adapted to be engaged by the corner of said triangle opposite said base.

15. An inclination balance according to claim 1, wherein said immobilizing means includes a stationary and a clamping rail adapted to be moved close to said stationary rail so as to clamp an end portion of said pendulum therebetween, and spring-biased traction means for optionally clamping and unclamping said pendulum in the respective deflected and oscillating positions.

References Cited in the file of this patent

UNITED STATES PATENTS

| 1,870,379 | Peruzzini | Aug. 9, 1932 |
| 2,016,098 | Peuker et al. | Oct. 1, 1935 |

FOREIGN PATENTS

| 434,418 | Great Britain | Aug. 26, 1935 |